US008055755B2

(12) United States Patent
Cole et al.

(10) Patent No.: US 8,055,755 B2
(45) Date of Patent: Nov. 8, 2011

(54) METHOD FOR DETERMINING VOIP GATEWAY PERFORMANCE AND SLAS BASED UPON PATH MEASUREMENTS

(75) Inventors: Robert G. Cole, Churchville, MD (US); Howard L. Lang, Wayside, NJ (US); Eric Woerner, Burlington Township, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1013 days.

(21) Appl. No.: 10/774,658

(22) Filed: Feb. 5, 2004

(65) Prior Publication Data
US 2005/0198266 A1    Sep. 8, 2005

(51) Int. Cl.
*G06F 15/173* (2006.01)
*G06F 15/16* (2006.01)
*H04L 12/26* (2006.01)
*G06F 11/00* (2006.01)

(52) U.S. Cl. .................. 709/224; 370/242; 370/248

(58) Field of Classification Search .......... 709/223–226, 709/240, 249, 203, 218, 235; 707/10; 370/352, 370/355, 395.21, 216–221, 225, 227, 228, 370/241.1, 242, 244, 245, 248, 250, 252; 715/733–756; 718/104, 105, 2, 25, 712
See application file for complete search history.

(56) References Cited

U.S. PATENT DOCUMENTS

| | | | | |
|---|---|---|---|---|
| 5,631,898 A * | 5/1997 | Dent | ........................... | 370/203 |
| 5,963,551 A * | 10/1999 | Minko | ........................... | 370/356 |
| 5,973,642 A * | 10/1999 | Li et al. | ........................... | 342/378 |
| 5,974,237 A * | 10/1999 | Shurmer et al. | ........................... | 709/224 |
| 6,041,041 A * | 3/2000 | Ramanathan et al. | ........................... | 370/241 |
| 6,496,140 B1 * | 12/2002 | Alastalo | ........................... | 342/174 |
| 6,625,115 B1 * | 9/2003 | Ikeda et al. | ........................... | 370/217 |
| 6,640,248 B1 * | 10/2003 | Jorgensen | ........................... | 709/226 |
| 6,650,617 B1 * | 11/2003 | Belotserkovsky et al. | ... | 370/210 |
| 6,711,134 B1 * | 3/2004 | Wichelman et al. | ........................... | 370/241 |
| 6,748,433 B1 * | 6/2004 | Yaakov | ........................... | 709/224 |
| 6,765,904 B1 * | 7/2004 | Anandakumar et al. | ........................... | 370/389 |
| 6,778,491 B1 * | 8/2004 | Fourcand et al. | ........................... | 370/217 |
| 6,785,292 B1 * | 8/2004 | Vogel | ........................... | 370/433 |
| 6,807,156 B1 * | 10/2004 | Veres et al. | ........................... | 370/252 |
| 6,813,241 B1 * | 11/2004 | Wang et al. | ........................... | 370/228 |
| 6,823,381 B1 * | 11/2004 | Harper | ........................... | 709/224 |
| 6,853,388 B2 * | 2/2005 | Ueno et al. | ........................... | 715/736 |
| 6,904,017 B1 * | 6/2005 | Meempat et al. | ........................... | 370/238 |
| 6,907,006 B1 * | 6/2005 | Sakamoto et al. | ........................... | 370/236.2 |

(Continued)

FOREIGN PATENT DOCUMENTS
WO    WO 00/79730    12/2000

OTHER PUBLICATIONS

EP Search Report, Dated Apr. 22, 2005, Application No. EP 05 10 0758, 4 pages.

(Continued)

*Primary Examiner* — Andrew Caldwell
*Assistant Examiner* — Melvin H Pollack

(57) ABSTRACT

A system and method make quality measurements in a network to determine if a Service Level Agreement is breached. The system includes a plurality of routers for routing traffic through the network, means for taking measurements on a path between a first router and a second router, and means for charging at least one of the plurality of routers when data related to the measurements falls below a target value.

20 Claims, 3 Drawing Sheets

U.S. PATENT DOCUMENTS

| | | | | |
|---|---|---|---|---|
| 6,912,258 B2* | 6/2005 | Birru | ............................ | 375/340 |
| 6,934,258 B1* | 8/2005 | Smith et al. | .................... | 370/238 |
| 6,965,597 B1* | 11/2005 | Conway | ........................ | 370/389 |
| 6,980,737 B1* | 12/2005 | Anslow et al. | .................. | 398/27 |
| 7,020,621 B1* | 3/2006 | Feria et al. | ...................... | 705/10 |
| 7,023,811 B2* | 4/2006 | Pinto | ............................ | 370/254 |
| 7,042,880 B1* | 5/2006 | Voit et al. | .................... | 370/395.1 |
| 7,050,401 B1* | 5/2006 | Wichelman et al. | ........... | 370/252 |
| 7,068,684 B1* | 6/2006 | Suder et al. | .................... | 370/493 |
| 7,075,932 B2* | 7/2006 | Matsuhira et al. | ........ | 370/395.31 |
| 7,082,463 B1* | 7/2006 | Bradley et al. | ................. | 709/223 |
| 7,085,230 B2* | 8/2006 | Hardy | ........................... | 370/232 |
| 7,099,280 B1* | 8/2006 | Shaffer et al. | ................. | 370/252 |
| 7,099,281 B1* | 8/2006 | Conway | ........................ | 370/252 |
| 7,099,282 B1* | 8/2006 | Hardy | ........................... | 370/252 |
| 7,111,074 B2* | 9/2006 | Basturk | ......................... | 709/241 |
| 7,120,122 B1* | 10/2006 | Starr et al. | ...................... | 370/250 |
| 7,120,139 B1* | 10/2006 | Kung et al. | ..................... | 370/352 |
| 7,149,917 B2* | 12/2006 | Huang et al. | ...................... | 714/4 |
| 7,151,769 B2* | 12/2006 | Stanforth et al. | ............. | 370/351 |
| 7,164,649 B2* | 1/2007 | Walton et al. | ................. | 370/203 |
| 7,167,443 B1* | 1/2007 | Dantu et al. | ..................... | 370/218 |
| 7,167,860 B1* | 1/2007 | Black et al. | ...................... | 707/10 |
| 7,190,676 B2* | 3/2007 | Anderson, Sr. | ............... | 370/236 |
| 7,191,229 B2* | 3/2007 | Edmondson | .................. | 709/224 |
| 7,209,473 B1* | 4/2007 | Mohaban et al. | ............. | 370/352 |
| 7,222,190 B2* | 5/2007 | Klinker et al. | ................. | 709/238 |
| 7,245,609 B2* | 7/2007 | D'Eletto | ........................ | 370/352 |
| 7,251,218 B2* | 7/2007 | Jorgensen | ..................... | 370/235 |
| 7,269,157 B2* | 9/2007 | Klinker et al. | ................. | 370/351 |
| 7,283,519 B2* | 10/2007 | Girard | ........................... | 370/353 |
| 7,315,511 B2* | 1/2008 | Morita et al. | ................. | 370/227 |
| 7,324,439 B2* | 1/2008 | Loo | ................................ | 370/217 |
| 7,336,613 B2* | 2/2008 | Lloyd et al. | .................... | 370/237 |
| 7,376,132 B2* | 5/2008 | Conway | ........................ | 370/389 |
| 7,394,760 B1* | 7/2008 | Nucci et al. | .................... | 370/225 |
| 7,406,539 B2* | 7/2008 | Baldonado et al. | ............ | 709/240 |
| 7,420,960 B2* | 9/2008 | Somekh et al. | ................ | 370/352 |
| 7,430,164 B2* | 9/2008 | Bare | ............................ | 370/217 |
| 7,496,046 B2* | 2/2009 | Kanazawa et al. | ............ | 370/252 |
| 7,586,899 B1* | 9/2009 | Mohaban et al. | ............. | 370/352 |
| 7,719,962 B2* | 5/2010 | Grover et al. | ................. | 370/229 |
| 2002/0152185 A1* | 10/2002 | Satish Jamadagni | ............. | 706/1 |
| 2003/0093513 A1 | 5/2003 | Hicks | | |
| 2003/0133443 A1* | 7/2003 | Klinker et al. | ................. | 370/353 |
| 2004/0252698 A1* | 12/2004 | Anschutz et al. | ........ | 370/395.21 |
| 2005/0052996 A1* | 3/2005 | Houck et al. | ................. | 370/230 |
| 2006/0182034 A1* | 8/2006 | Klinker et al. | ................. | 370/238 |

OTHER PUBLICATIONS

Abella A., et al: "Differentiated Services Versus Over-Provisioned Best-effort for pure-IP Mobile Networks" 2002, 4th Int'l Workshop, Sep. 9-11, 2002, IEEE, Sep. 9, 2002, pp. 450-457.

Krile, S: "Path-Level Congestion Avoidance Mechanisms in End-to-End QoS-Routing", Information Technology Interfaces, 2003, ITI 2003, Proceedings of the 25th International Conference on Jun. 16-19, 2003, IEEE Jun. 16, 2003, pp. 569-574.

Examiner's Report for CA 2,495,873, Feb. 25, 2008, pp. 1-2.

* cited by examiner

METHOD FOR DETERMINING VOIP GATEWAY PERFORMANCE AND SLAS BASED UPON PATH MEASUREMENTS

BACKGROUND OF THE INVENTION

Voice-Over-Internet Protocol (VoIP) is attracting a multitude of users because VoIP offers tremendous cost savings relative to a Public Switching Telephone Network (PSTN). For instance, users may bypass long-distance carriers with per minute charges in lieu of transmitting voice calls over the Internet for a flat monthly Internet access fee.

Internet telephony within an intranet enables users to reduce costs by eliminating long-distance charges between sites included in the intranet. An intranet is a local-area network which may or may not be connected to the Internet, but which has some similar functions. The intranet is used for connectivity within, for example, a company. Some companies set up World Wide Web servers on their own internal networks so employees have access to the organization's Web documents. Users may make point-to-point calls via gateway servers attached to a local-area network. For example, a user may want to make a point-to-point call to another user in another office included in the same intranet. The calling party will dial an extension to connect with the gateway server, which is equipped with a telephony board and compression-conversion software; the server configures a private branch exchange (PBX) to digitize the upcoming call. The calling party then dials the number of the called party and the gateway server transmits the call over the IP-based wide-area network to the gateway to the destination office. The destination gateway converts the digital signal back to analog format and delivers the call to the called party.

Although progressing rapidly, VoIP continues to exhibit decreased reliability and sound quality when compared to the PSTN, due primarily to limitations both in Internet bandwidth, current compression technology, delay, jitter, and packet loss. Because the Internet is a packet-switched network, the individual packets of each voice signal may travel over separate network paths for reassembly in the proper sequence at the destination. Although transmitting each packet over a separate path creates a high efficiency for network resources over the PSTN, the chances for packet loss also increase. Packet loss shows up in the form of gaps or periods of silence in a conversation, leading to a clipped-speech effect that is unsatisfactory for most users and unacceptable in business communications. As a result, most corporations looking to reduce communication costs confine their Internet-telephony applications to their intranets. With more predictable bandwidth available than the public Internet, intranets can support full-duplex, real-time voice communications. However, restricting Internet telephony to company intranets does not allow optimum cost saving benefits or flexibility when compared to Internet-telephony over the public Internet.

To date, most developers of Internet-telephony software, as well as vendors of gateway servers, have been using a variety of speech-compression protocols. The use of various speech-coding algorithms, with different bit rates and mechanisms for reconstructing voice packets and handling delays, produces varying levels of intelligibility and fidelity in sound transmitted over the public Internet.

An evolving solution to the varying levels of quality of sound, etc. transmitted over the Internet is to tier the public Internet. Users of the public Internet will then be required to pay for the specific service levels or Quality of Service (QoS) they require. A Service Level Agreement (SLA) is a contract between a carrier and a customer that defines the terms of the carrier's responsibility to the customer and the type and extent of remuneration if those responsibilities are not met. Reports on the QoS based on either per-call measurements or per-path measurements are a tool for determining if carrier responsibilities are met and if not, any rebate due to the customer. Per-call measurements are capable of illustrating voice quality on a call-by-call basis, which more closely reflects the customer's calling experience. However, in many cases, VoIP gateways or IP-PBXs are managed by the customer and therefore per-call information is not available. For instance, when a customer manages the VoIP gateways, the customer security restrictions or technical constraints may prevent the dissemination of per-call information.

Currently, one solution requires the installation of additional hardware at each customer site to take performance measurements. This solution is not scalable and due to the excessive hardware costs, additional cost of maintaining equipment, and additional network connectivity required to communicate and support the additional hardware, most cost-conscious users would not implement the additional hardware.

Therefore, there is a need for a system and method for making path-based VoIP quality measurements without deploying additional hardware at each customer site.

SUMMARY OF THE INVENTION

The present invention relates to a method and system for making quality measurements in a VoIP network. More particularly, one aspect of the present invention relates to a system for making quality measurements in a network. The system includes a plurality of routers for routing traffic through the network, means for taking measurements on a path between a first router and a second router, and means for charging at least one of the plurality of routers when data related to the measurements falls below a target value.

In another aspect, the present invention relates to a method of making quality measurements in a network. The term "R-Factor" as utilized herein refers to an objective measure of voice quality that, for example, accounts for equipment impairments, latency, jitter, and packet loss such as is defined in ITU Standard G.107. The method includes the steps of tracking at least one path that exhibits an R-Factor below a target threshold, tracking a start time indicating when the R-Factor of a particular path falls below the target value, and tracking an end time indicating when the R-Factor of the particular path rises above the target value. The method also includes the steps of determining if an overlap exists between the start time and the end time for multiple paths connecting to a particular router, charging the particular router with one degradation if the overlap exists, and charging the particular router with each degradation if the overlap does not exist.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

Many VoIP customers require SLA support which is achieved by evaluating the quality of calls placed on the network. Most SLAs are related to router performance, not path performance and therefore, embodiments of the present invention translate measurements of the performance of the path between routers into measurements of the performance of the routers. The router performance measurements, in this example, the R-Factor, are used to determine if the QoS guaranteed in the SLA is maintained on a per-site basis. The R-Factor is monitored between designated sites throughout a predetermined amount of time (e.g., a week, a month, etc.) and the QoS guaranteed by the SLA is met if the R-Factor is maintained above a predetermined target value.

Figure 1:
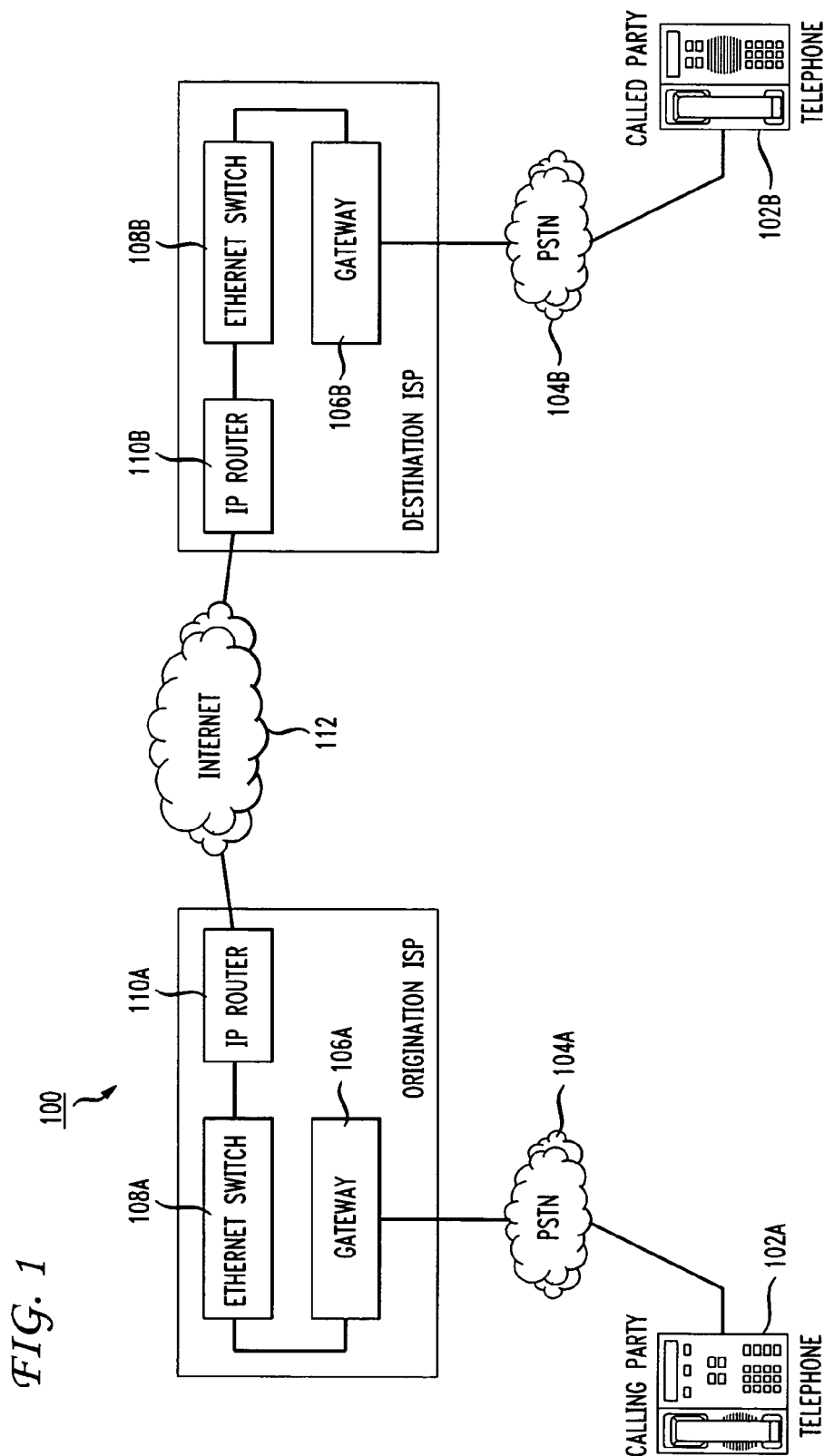
FIG. 1 is a block diagram of an exemplary VoIP network that may be utilized in accordance with an embodiment of the present invention.

Referring now to FIG. 1, a block diagram of an exemplary VoIP network that may be utilized in accordance with an embodiment of the present invention is illustrated. The VoIP network 100 routes calls from a calling party 102A through a Public Switched Telephone Network (PSTN) 104A to a gateway 106A. As previously mentioned, the gateway 106A may be managed by the customer and therefore, no call detail information is available through the gateway 106A. The call passes through an Ethernet switch 108 to an IP router 110A that may be operated by the supplier of the VoIP service. The call is routed through the Internet 112 to another IP router 110B. The call is then routed through an Ethernet switch 108B, gateway 106B, and PSTN 104B, to the called party 102B. Embodiments of the present invention are utilized to measure the performance of the path between, for example, IP routers 110A and 110B to determine if the QoS guaranteed is experienced by the calling party 102A and the called party 102B.

Figure 2:
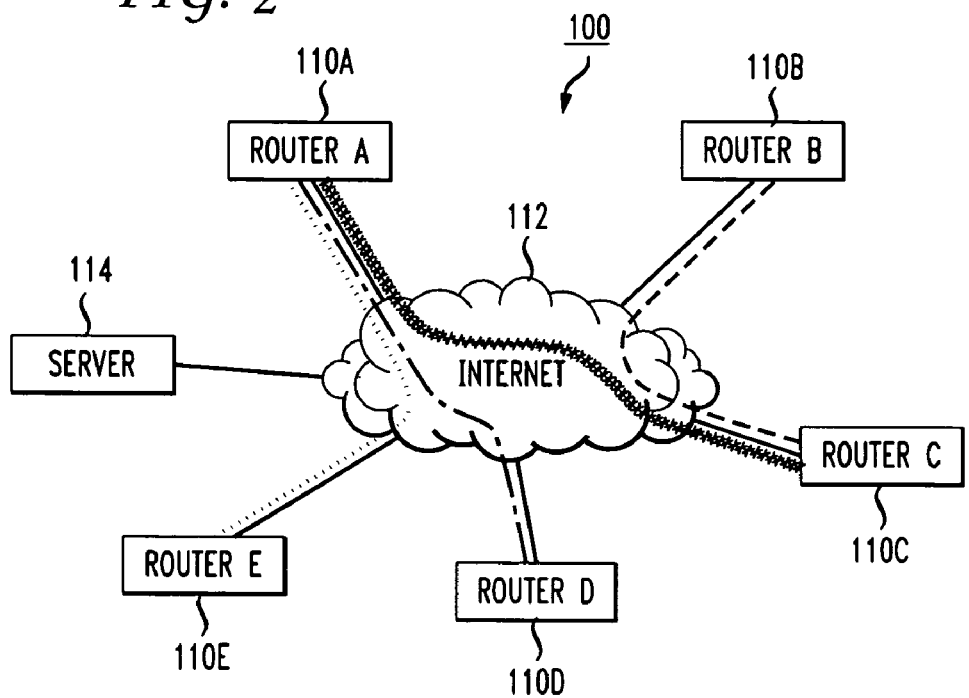
FIG. 2 is a block diagram of an exemplary VoIP network illustrating multiple routers.

Referring now to FIG. 2, a block diagram of an exemplary VoIP network 100 illustrating a plurality of IP routers 110 is illustrated. Embodiments of the present invention monitor the paths between the customer sites. Therefore, if a problem occurs in a path between routers 110, the particular site that the problem should be attributed to is determined. As evidenced by router A, each router may be a connection point for multiple paths. Therefore, multiple paths may be monitored for a given router 110 such as router A 110A. For router A 110A, the paths between router A 110A and router E 110E, router D 110D, and router C 110C are monitored.

When the R-Factor falls below the target value for a specific path, a degradation is charged to the router 110 at each end of the path. For example, if the path between router A 110A and router C 110C has degraded below the target value, then a degradation is charged to router A 110A and to router C 110C. However, when a router 110 that is a connection point for multiple paths fails, several paths may degrade below the target value. However, in accordance with an aspect of the present invention, if a router 110 that is a connection point for multiple paths fails, the router 110 is charged with one degradation despite the fact that multiple paths may fall below the target value. This aspect prevents double counting of a single failure event. A server 114 responsible for performing path measurements may perform the fore-mentioned calculations, or alternately two separate servers or a separate dedicated device could be utilized.

Figure 3:
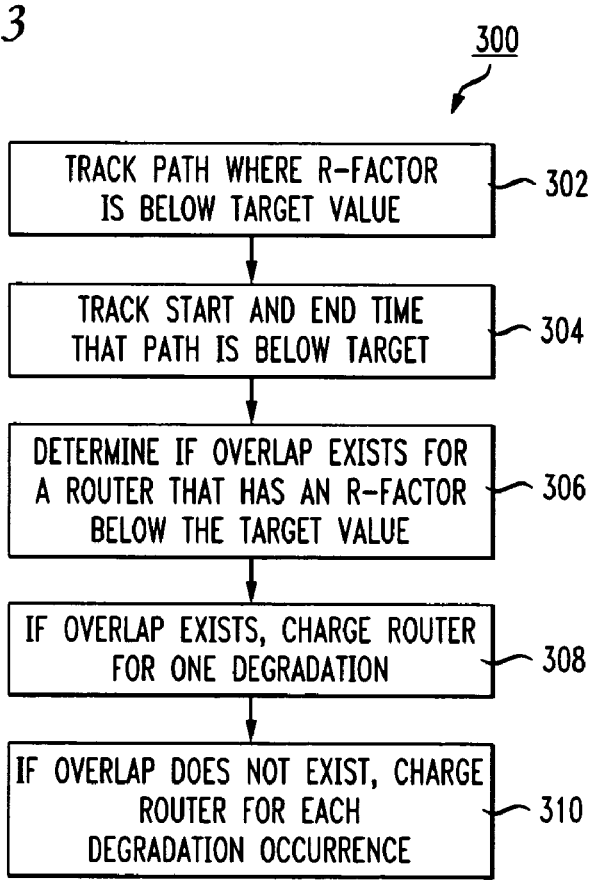
FIG. 3 is a method for determining the occurrence of degradations in a VoIP network.

Referring now to FIG. 3, a method 300 of implementing an embodiment of the present invention is illustrated. At step 302, at least one path that is below a target value is tracked. At step 304, the start and end times that the path is below the target value is tracked. At step 306 it is determined whether an overlap in the start and end times for a particular router 110 exists. If an overlap exists, at step 308 the particular router 110 is charged for one degradation. If an overlap does not exist, at step 310 the particular router 110 is charged for each degradation occurrence. As evidenced by the exemplary method 300, if a router 110 fails and affects the performance of multiple paths, the start and end times of the failure of each path are tracked. Because the start and end times of each failure will overlap to some extent when the cause is a single failing router 110, the failing router 110 is charged for one degradation despite the fact that multiple degradations are tracked along various paths connected to the failing router. For example, if router 110A is not functioning properly, a below target R-Factor may be seen in paths between routers A 110A and router C 110C, router D 110, and router E 110E. In this case, router A 110A is charged once, not three times, for falling below the target value.

Figure 4:
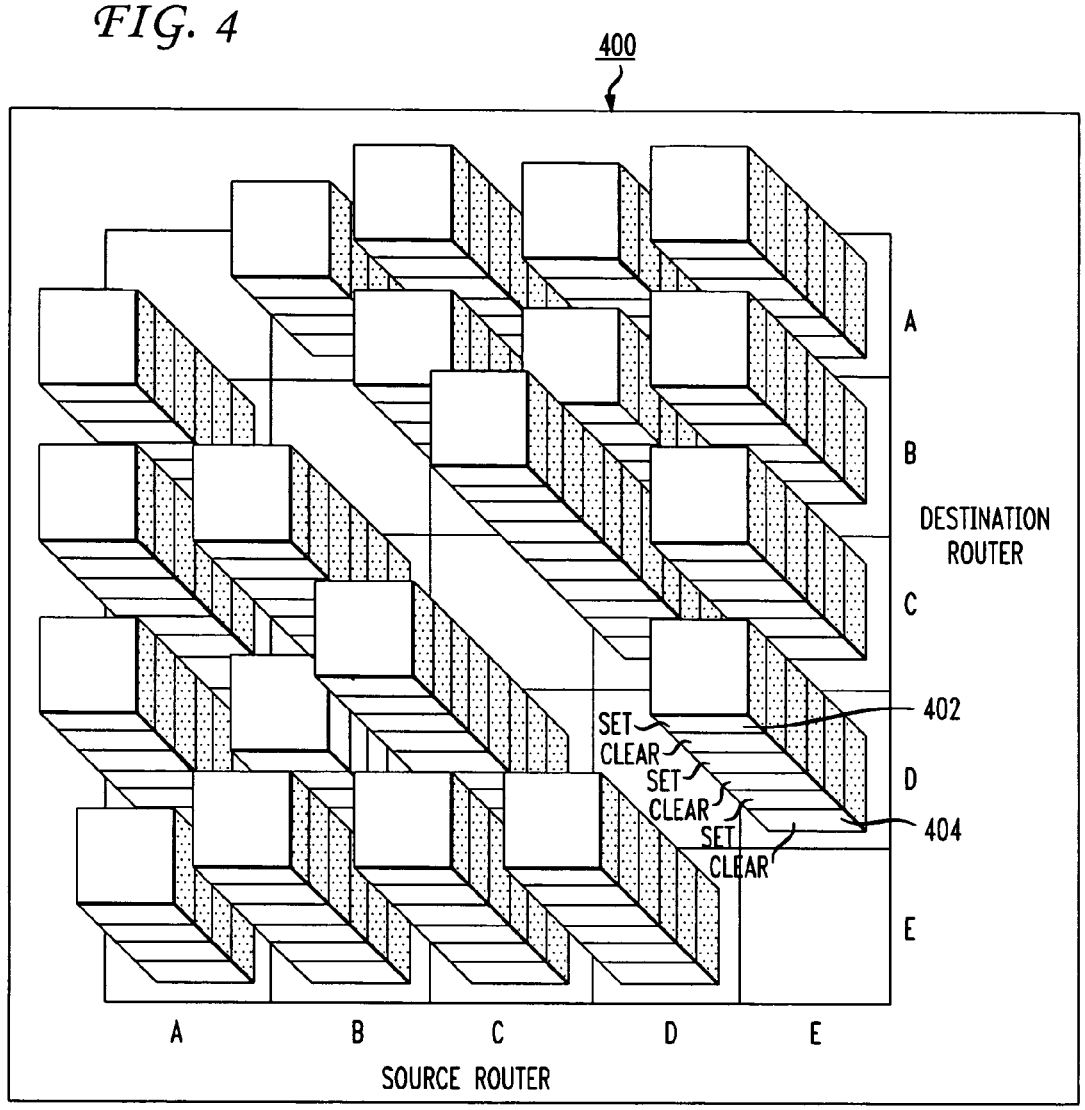
FIG. 4 is a diagram illustrating a matrix of set and clear events in accordance with an embodiment of the present invention.

Referring now to FIG. 4, an embodiment of the present invention is illustrated as a matrix 400 based on source and destination routers 110. A router pair, such as router A 110A and router B 110B, may experience a problem forcing the R-Factor below the target value. If the R-Factor falls below the target value, then a SET event 402 is written into the matrix 400 at the location of the failure, for example A, B and B, A. When the router pair resumes normal functionality and the R-Factor is restored to a value above the target value, then a CLEAR event 404 is written into the matrix 400 at the same location, in this example, location A, B and B, A.

The matrix 400 may be edited by a manual mechanism (preferably a web interface) that allows the supplier to indicate a site where a problem occurs that results in a breach of the SLA. In addition, the manual mechanism may also allow the supplier to indicate the nature of the problem (i.e., power failure), a start time indicating when the R-Factor falls below the target value, an end time indicating when the R-Factor rises above the target value, and an identifier (i.e., name, initials, etc.) of the individual that reports the problem. The nature of the problem, as well as any other information may be manually typed in or entered with a drop down menu or other similar data entry means.

When SET events or CLEAR events occur, they may be entered into the matrix 400 in GMT time or the local time where the event occurs. The elapsed time of the SLA breach begins when the first SET event occurs for a particular site, and the elapsed time ends when all the events are CLEARED. It is possible that there are multiple SET events which occur at overlapping times. For the purposes of determining the elapsed time of the SLA breach, the elapsed time begins when the first SET event happens, and ends when the last SET event for that site has CLEARED.

A set of reports may be generated based on the events logged into the matrix 400. For example, an exclusion period report may be generated that lists each site for each customer. The exclusion period report may indicate time periods where the R-Factor is below the target value (if any) along with a reason code that indicates the reason for the R-Factor falling below the target value. The matrix may also be utilized to generate an SLA Report: The SLA report lists each site for each customer and indicates the measured R-Factor for a predetermined time period (e.g., a month), adjusted by any time periods where the R-Factor falls below the target value. The percentage of the month that the measured R-Factor for the site was greater than or equal to the target value may also be shown in the SLA report (the elapsed time that no SET events occur for that site). An R-Factor report may be generated that lists the paths measured for each customer. The R-Factor report may indicate the percentage of time that the R-Factor is greater than or equal to the target value. The reports may be available for current month-to-date, as well as monthly reports for a prior predetermined amount of time (e.g., 3 months).

Although the above embodiments have been described with reference to intranet/Internet, the present invention may be equally applicable to other environments such as peer-to-peer Internet, solely intranet environments, etc.

The previous description is of various embodiments for implementing the invention, and the scope of the invention should not necessarily be limited solely by these descriptions. The scope of the present invention is instead defined by the following claims.

What is claimed is:

1. A system for making quality measurements in a network having a plurality of routers for routing traffic through the network, the system comprising:
    a hardware server, wherein the hardware server is configured to:
        take measurements on each path of all paths within the network, wherein the each path is between a pair of routers from the plurality of routers;
        determine paths of the all paths within the network that have data related to the measurements that falls below a target value;
        determine a particular router of the plurality of routers that is associated with the paths that have data related to the measurements that falls below the target value;
        determine if the particular router is a connection point for two or more of the paths that have data related to the measurements that falls below the target value; and
        charge, after it is determined that the particular router is the connection point for two or more of the paths that have data related to the measurements that falls below the target value, a single degradation against the particular router of the plurality of routers even though the particular router is responsible for multiple path failures and tracking a number of degradations for each one of the plurality of routers in the network over a period of time.

2. The system of claim 1, wherein the network is a voice over internet protocol network.

3. The system of claim 1, wherein the data related to the measurements is an R-Factor.

4. The system of claim 1, further comprising a manual mechanism for entering information into a matrix.

5. The system of claim 4, wherein the information comprises an indication of a nature of the problem.

6. The system of claim 4, wherein the matrix includes a matrix of source routers and destination routers.

7. The system of claim 6, wherein the matrix includes set events and clear events for one of the source routers and one of the destination routers.

8. A method of making quality measurements in a network, the method comprising:
    monitoring an R-Factor for each path of all paths within the network, wherein the each path is between a pair of routers;
    tracking a path that exhibits the R-Factor below a target value;
    tracking a start time indicating when the R-Factor of the path falls below the target value;
    tracking an end time indicating when the R-Factor of the path rises above the target value;
    determining if an overlap exists between the start time and the end time for multiple paths connecting to a particular router;
    charging the particular router connected to the multiple paths with one degradation if the overlap exists;
    charging the particular router with each degradation connected to the multiple paths if the overlap does not exist; and
    tracking a number of degradations for each router of all routers in the network over a period of time.

9. The method of claim 8, wherein the target value is 70.

10. The method of claim 8, further comprising entering the start time as a set event in a matrix.

11. The method of claim 8, further comprising entering the end time as a clear event in a matrix.

12. A hardware server for making quality measurements in a network comprising the hardware server configured to:
    take measurements on each path of all paths within the network, wherein the each path is between a pair of routers from the plurality of routers;
    determine paths of the all paths within the network that have data related to the measurements that falls below a target value;
    determine a particular router of the plurality of routers that is associated with the paths that have data related to the measurements that falls below the target value;
    determine if the particular router is a connection point for two or more of the paths that have data related to the measurements that falls below the target value; and
    charge, after it is determined that the particular router is the connection point for two or more of the paths that have data related to the measurements that falls below the target value, a single degradation against the particular router of the plurality of routers even though the particular router is responsible for multiple path failures and tracking a number of degradations for each one of the plurality of routers in the network over a period of time.

13. The hardware server of claim 12, wherein the network is a voice over internet protocol network.

14. The hardware server of claim 12, wherein the data related to the measurements is an R-Factor.

15. The hardware server of claim 12, further comprising a manual mechanism for entering information into a matrix.

16. The hardware server of claim 15, wherein the information comprises an indication of a site where a problem occurs.

17. The hardware server of claim 15, where the information further comprises an indication of a nature of the problem.

18. The hardware server of claim 15, wherein the matrix includes a matrix of source routers and destination routers.

19. The hardware server of claim 18, wherein the matrix includes set events and clear events for one of the source routers and one of the destination routers.

20. The hardware server of claim 15, wherein the information comprises an identifier of an individual who reports the problem.

* * * * *